United States Patent [19]
Paquet et al.

[11] Patent Number: 5,650,106
[45] Date of Patent: Jul. 22, 1997

[54] EXTRUDED FOAMS HAVING A MONOVINYL AROMATIC POLYMER WITH A BROAD MOLECULAR WEIGHT DISTRIBUTION

[75] Inventors: Andrew N. Paquet, Granville, Ohio; Duane B. Priddy, Midland, Mich.; Chau V. Vo, Souffelweyersheim, France; William C. Pike; Jerry L. Hahnfeld, both of Midland, Mich.

[73] Assignees: The Dow Chemical Company, Midland, Mich.; Dow Deutschland Inc., Stade, Germany

[21] Appl. No.: 667,700

[22] Filed: Jun. 21, 1996

[51] Int. Cl.$^6$ ............................................. C08J 9/14
[52] U.S. Cl. .................. 264/53; 264/50; 521/79; 521/81; 521/98; 521/146
[58] Field of Search .............. 264/50, 53; 521/79, 521/81, 98, 146

[56] References Cited

U.S. PATENT DOCUMENTS 4,663,357  5/1987  Meyer et al. ........................ 521/59
4,673,694  6/1987  Meyer et al. ........................ 521/59

FOREIGN PATENT DOCUMENTS 7109315   4/1995  Japan .................. C08F 12/08
7258444  10/1995  Japan .................. C08J 9/04

*Primary Examiner*—Morton Foelak
*Attorney, Agent, or Firm*—J. Robert Dean, Jr.

[57] ABSTRACT

Disclosed is an extruded, linear, bimodal monovinyl aromatic polymer foam having a weight average molecular weight of from about 100,000 to about 200,000, greater than 5 percent by weight of its polymer chains having a weight average molecular weight of 500,000 to 1,000,000, and less than 5 percent by weight of its polymer chains having a weight average molecular weight of greater than 1,000,000. Use of the polymer enables process pressure drop to be significantly reduced and allows the formation of a foam of lower density and larger cross-section. Further disclosed is a process for making the extruded foam.

10 Claims, No Drawings

EXTRUDED FOAMS HAVING A MONOVINYL AROMATIC POLYMER WITH A BROAD MOLECULAR WEIGHT DISTRIBUTION

BACKGROUND OF THE INVENTION

This invention relates to an extruded, monovinyl aromatic polymer foam comprising a monovinyl aromatic polymer with a broad molecular weight distribution of certain configuration. This invention further relates to a process for making the foam.

Historically, chlorofluorocarbons were employed as blowing agents in making monovinyl aromatic polymer foams for insulating applications. The foams provided excellent insulation performance of long duration.

Due to concerns over potential ozone depletion, hydrochlorofluorocarbons such as 1-chloro-1,1-difluoroethane (HCFC-142b) have largely replaced chlorofluorocarbons as a blowing agent in insulating monovinyl aromatic polymer foams. Such foams provide excellent insulating performance while exhibiting substantially lower ozone depletion potential.

It may be desirable to employ blowing agents which exhibit further reduced or zero ozone depletion potential. Possible agents include carbon dioxide and 1,1,1,2-tetrafluoroethane (HFC-134a).

A problem with employing blowing agents such as carbon dioxide or HFC-134a is they exhibit relatively high vapor pressures and low solubility in melts of monovinyl aromatic polymers. As a result, extrusion foaming systems employing them can experience processing problems such as high pressure drop and high die pressure and product problems such as poor skin quality, high density, and small foam cross-section.

It would be desirable to develop an extrusion process wherein processing problems could be reduced and desirable product properties maintained. It would be further desirable to develop a polymer resin substrate which facilitated the attainment of same.

BRIEF SUMMARY OF THE INVENTION

According to the present invention, there is an extruded, monovinyl aromatic polymer foam. The foam comprises a polymer material comprising greater than 50 percent by weight of monovinyl aromatic monomeric units. The polymer material further comprises a linear monovinyl aromatic polymer of broad molecular weight distribution having a weight average molecular weight of from about 100,000 to about 250,000, having greater than 5 percent by weight of its polymer chains having a weight average molecular weight of 500,000 to 1,000,000, and less than 5 percent by weight of its polymer chains having a weight average molecular weight of greater than 1,000,000.

Further according to the present invention, there is a process for making an extruded, monovinyl aromatic polymer foam. The process comprises heating a polymer material to form a melt polymer material; incorporating into the melt polymer material at an elevated pressure a blowing agent to form a foamable gel; cooling the foamable gel to a desirable foaming temperature; and extruding the foamable gel through a die to form the foam. The monovinyl aromatic polymer material comprises greater than 50 percent by weight of monovinyl aromatic monomeric units. The polymer material further comprises the linear, broad distribution monovinyl aromatic polymer described above.

DETAILED DESCRIPTION

The present foam comprises a linear, broad distribution monovinyl aromatic polymer having a weight average molecular weight ($M_w$) of about 100,000 to about 250,000. Greater than 5 percent by weight and preferably greater than 10 percent by weight of its polymer chains are of a weight average molecular weight of from 500,000 to 1,000,000 based upon the total weight of the polymer chains of the alkenyl aromatic polymer. Less than 5 percent by weight of its polymer chains are of a weight average molecular weight of greater than 1,000,000 based upon the total weight of the polymer chains of the alkenyl aromatic polymer. For purposes of polymer chain weight percent calculations, polymer chains are polymer molecules having at least ten monovinyl aromatic monomeric units. Residual monomer and oligomer content are excluded (not included) for calculation purposes. The polymer preferably has a Z-average ($M_z$) molecular weight of from about 200,000 to about 900,000 and more preferably from about 250,000 to about 600,000. The polymer preferably has a polydispersity index ($M_w/M_n$) of about 2 to about 10 and more preferably about 2.2 to about 7. The polymer preferably has a $M_z/M_w$ ratio of about 1.5 to about 5 and more preferably about 1.8 to about 4. The polymer preferably exhibits a melt flow rate of from about 6 to about 99 and more preferably from about 15 to about 60 according to ASTM 1238, Condition 200/5. Weight average molecular weight and Z-average molecular weight are both determined according to size exclusion chromotography (SEC).

The linear, broad distribution monovinyl aromatic polymer useful in the present foam may be prepared by blending two or more linear monovinyl aromatic polymers of different molecular weight distributions or by in-situ polymerization. Advantageously, the broad distribution polymer may be formed by feeding a previously polymerized higher molecular weight polymer dissolved in monomer into a polymerization zone or reactor wherein an intermediate weight polymer is produced in the presence of the high molecular weight polymer. Such polymerizations are described in U.S. Pat. No. 4,585,825, which is incorporated herein by reference. By way of illustration, a broad molecular weight distribution of a linear monovinyl aromatic polymer is shown in FIG. 3 of U.S. Pat. No. 4,585,825.

It was found surprising that an extruded foam could be made at lower system pressure drop and die pressure with the broad distribution, linear monovinyl aromatic polymer described above compared to conventional monovinyl aromatic polymers of equivalent weight average molecular weight typically employed commercially to produce foams. It was further found surprising that foams of lower density and larger cross-section could be produced compared to foams made with the conventional monovinyl aromatic polymers.

The unique broad molecular distribution of the linear monovinyl aromatic polymer may provide the surprising extrusion foaming performance. The majority distribution of polymer chains of weight average molecular weights of about 25,000 to about 100,000 provide a polymer in melt form which exhibits a relatively low shear viscosity. The low shear viscosity affords reduction in system pressure drop and die pressure, particularly when employing blowing agents of relatively high vapor pressure and low solubility in melts of monovinyl aromatic polymers such as carbon dioxide and HFC-134a. The distribution of polymer chains of weight average molecular weight of greater than 500,000 provides relatively high polymer elongational viscosity in melt form, which affords relatively low density and large cross-section in the resulting foam product. The relatively high elongational viscosity of the melt polymer affords greater melt strength and, subsequently, improved foam expansion of the melt out of the die prior to the cooling and cessation of expansion. That lower density and larger cross-section were obtained was surprising in view of the fact that cell size was observed to be smaller than obtained with conventional alkenyl aromatic polymers of equivalent weight average molecular weight. When employing conventional monovinyl aromatic polymers, a decrease in cell size is usually accompanied by higher density and lower cross-section, the opposite of what was observed in the present foams. The distribution of polymer chains of weight average molecular weight of greater than 1,000,000 is limited to minimize or prevent flow stabilization problems arising from excess elongational viscosity.

Monovinylidene aromatic polymers are those comprising at least a major portion of an addition polymerized monomer of the formula:

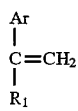

wherein $R_1$ is selected from the group of radicals consisting of hydrogen and alkyl radicals containing three carbons or less and Ar is selected from the group of radicals consisting of phenyl, halophenyl, alkylphenyl and alkylhalophenyl. Preferably, $R_1$ is a hydrogen or methyl radical. Preferably, Ar is phenyl or alkylphenyl. Preferably, the polymer is polystyrene.

The present foam comprises a polymer material. The polymer material comprises in whole or in part the linear, broad distribution monovinyl aromatic polymer described above. The monovinyl aromatic polymer may be a homopolymer or a copolymer formed from monovinyl aromatic monomers and copolymerizable ethylenically unsaturated comonomers. Minor amounts of monoethylenically unsaturated comonomers such as $C_{2-6}$ alkyl acids and esters, ionomeric derivatives, and $C_{4-6}$ dienes may be copolymerized with monovinyl aromatic monomers. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. Comonomer content is less than 50 percent and preferably less than 20 percent based upon the weight of the alkenyl aromatic polymer. Regardless of composition, the polymer material comprises greater than 50 and preferably greater than 70 weight percent monovinyl aromatic monomeric units. Most preferably, the monovinyl aromatic polymer material is comprised substantially or entirely of monovinyl aromatic monomeric units. The polymer material may include minor proportions of non-monovinyl aromatic polymers such as polyethylene.

Plasticizing polymers may be incorporated into the polymer material to further enhance polymer melt processability. Useful plasticizing polymers include low molecular weight polymers of alpha methyl styrene or limonene, with d-limonene being the preferred limonene. The plasticizing polymer can be a copolymer or a homopolymer. Useful plasticizing polymers are disclosed in U.S. Pat. No. 5,422,378, which is incorporated herein by reference.

The present foam is generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (evacuated or vacuum), but is preferably at an atmospheric level.

Blowing agents useful in making the present foam include inorganic agents, organic blowing agents and chemical blowing agents. Suitable inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms and fully and partially halogenated aliphatic hydrocarbons having 1–4 carbon atoms. Aliphatic hydrocarbons include methane ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), 1,1,2,2-tetrafluoromethane (HFC-134), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

Though the present process may employ any known blowing agent, the process is particularly useful with blowing agents exhibiting high vapor pressure and low solubility in monovinyl aromatic polymer melts. Such blowing agents include carbon dioxide, 1,1,1,2-tetrafluoroethane (HFC-134a). A particularly useful blowing agent system is one comprised entirely of carbon dioxide.

The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

A nucleating agent may be added in order to control the size of foam cells. Preferred nucleating agents include inorganic substances such as calcium carbonate, talc, clay, titanium dioxide, silica, barium stearate, calcium stearate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The present foam has the density of from about 10 to about 150 and most preferably from about 10 to about 70 kilograms per cubic meter according to ASTM D-1622-88. The foam has an average cell size of from about 0.1 to about 5.0 and preferably from about 0.2 to about 1.5 millimeters according to ASTM D3576-77.

The present foam may take any physical configuration known in the art such as sheet or plank. The present foam is particularly suited to be formed by extrusion into a plank, desirably one having a cross-sectional area of 30 square centimeters ($cm^2$) or more and a minor dimension in cross-section (thickness) of ⅜ inch (0.95 centimeter) or more. The present foam may also be extruded in the form of a sheet of less than ⅜ inch (0.95 centimeter) cross-section thickness and a cross-sectional area of 10 $cm^2$ or more.

The present foam may be closed cell or open cell. Preferred closed-cell foams have greater than 90 percent closed cell content according to ASTM D2856-87.

Various additives may be incorporated in the present foam structure such as inorganic fillers, pigments, antioxidants, acid scavengers, ultraviolet absorbers, flame retardants, processing aids, extrusion aids, and the like.

The present foam may be used to insulate a surface by applying to the surface an insulating panel fashioned from the foam. Such panels are useful in any conventional insulating applications such as roofing, buildings, refrigerators, etc.

The following are examples of the present invention, and are not to be construed as limiting. Unless otherwise indicated, all percentages, parts, or proportions are by weight.

EXAMPLES

Monovinyl aromatic polymer foams of the present invention are made according to the process of the present invention.

The physical properties of the polymer resins employed in carrying out the examples and control examples below are set forth in Table 1.

Example 1 and Control Example 1

Monovinyl aromatic polymer foams of the present invention were prepared. End product foam properties and foam process parameters were determined.

The apparatus comprised a 1½ inch (3-8 cm) extruder, a mixer, and an extrusion die in series. A polymer resin and certain additives were dry-blended and fed to the extruder, where they were melted and mixed to for a polymer melt. The polymer melt was conveyed to the mixer, where a blowing agent as injected and mixed therein to form a foamable gel. The foamable gel was conveyed through a die into a region of atmospheric pressure to effect expansion and formation of the foam product.

Examples of the foam were made with a polystyrene of a broad molecular weight distribution (Broad Distribution Resin #1) having the resin physical properties set forth in Table 1. Control examples were made with a polymer resin of a conventional polystyrene of unimodal molecular weight distribution (Control Resin #1) having the physical properties set forth in Table 1. Carbon dioxide was employed as the blowing agent at two different loading levels.

The foams of the invention could be made at a lower process pressure drop than for the control foams despite the significantly higher weight average molecular weight of the broad distribution resin. The foams of the invention could also be made at a larger cross-section and a lower density than the control examples because of the greater elongational viscosity at foaming conditions. Results are set forth in Table 2.

Example 2 and Control Example 2

Monovinyl aromatic polymer foams of the present invention were prepared. End product foam physical properties and foam process parameters were determined.

The apparatus comprised a 2½ inch (6.35 cm) extruder, a mixer, and an extrusion die in series. A polymer resin and certain additives were dry-blended and fed to the extruder, where they were melted and mixed to for a polymer melt. The polymer melt was conveyed to the mixer, where a blowing agent was injected and mixed therein to form a foamable gel. The foamable gel was conveyed through a die into a region of atmospheric pressure to effect expansion and formation of the foam product.

Examples of the foam were made with a polystyrene resin of a broad molecular weight distribution (Broad Distribution Resin #2) having the resin physical properties set forth in Table 1. Control foams were made with a blend of polymer resins of a 90:10 weight ratio of Control Resin #1 and SAMS. The SaMS was a styrene/alpha methyl styrene copolymer having a weight average molecular weight of 4500, a polydispersity index of 3.0. The blend of 90:10 had a melt flow rate of 35, and an elongational viscosity of 516,839. Additives employed were hexabromocyclododecane (2.5 pph), barium stearate (0.01 pph), colorant (1 pph), tetrasodium-pyrophosphate (0.1 pph), and polyethylene (0.4 pph). Carbon dioxide was employed as the blowing agent at two different loading levels.

The foams of the invention could be made at an approximately 20 percent lower process pressure drop than for the control foams even though the control resin blend contained a plasticizing polymer (SAMS). The foams of the invention could also be made at a 10 percent increase in cross-section and a 5 percent decrease in density compared to the control foams. The larger cross-sections and lower densities were surprising since average cell sizes decreased 25 percent for the foams of the invention compared to the control foams. Typically, in conventional extrusion foaming, a decreased in cell size results in a decrease in cross-section and an increase in density. These responses are caused by the greater elongational viscosity and weight fraction of the high molecular weight component of the polymer. The foams of the invention also exhibited excellent mechanical properties as evidenced by their compressive strengths and dimensional stability. Results are set forth in Table 3.

Example 3 and Control Example 3

Monovinyl aromatic polymer foams of the present invention were prepared. End product foam physical properties and foam process parameters were determined.

The apparatus comprised a ¾ inch (1.9 cm) extruder, a mixer, and an extrusion die in series. A polymer resin and certain additives were dry-blended and fed to the extruder, where they were melted and mixed to for a polymer melt. The polymer melt was conveyed to the mixer, where a blowing agent was injected and mixed therein to form a foamable gel. The foamable gel was conveyed through a die into a region of atmospheric pressure to effect expansion and formation of the foam product.

Foams of the invention were made with Broad Distribution Resins #2, #3, and #4. Control foams were made with a polymer resin of a 90:10 weight ratio of Control Resin #1 and SaMS of Example 1. Additives employed were barium stearate (0.1 pph) and polyethylene (0.4 pph). Carbon dioxide was employed as the blowing agent at two different loading levels.

The foams of the invention could be made at an approximately 20 percent lower process pressure drop than for the control foams. The foams of the invention could also be made at a 10 percent increase in cross-section and a 5 percent decrease in density compared to the control foams. Larger cross-sections and lower densities were achieved for the foams of the invention than for the control foams. These responses were caused by the greater melt strength of the broad distribution resins. Results are set forth in Table 4.

TABLE 1

RESIN PROPERTIES

| Property | Control Resin #1 | Broad Distribution Resin #1 | Broad Distribution Resin #2 | Broad Distribution Resin #3 | Broad Distribution Resin #4 |
|---|---|---|---|---|---|
| $M_w^1$ | 136.8 | 247 | 143 | 186.4 | 168.4 |
| $M_n^2$ | 62.9 | 39 | 39.9 | 27.9 | 26.2 |
| $M_z^3$ | 235 | 936 | 389.2 | 568.1 | 599.1 |
| $M_w/M_n^4$ | 2.17 | 6.33 | 3.58 | 6.68 | 6.43 |
| % > 1MM[5] | 0.0 | 5.0 | 0.7 | 2.5 | 2.7 |
| % < 100M[6] | 47.8 | 58.6 | 59.8 | 57.3 | 64.3 |
| % < 25M[7] | 6.6 | 19 | 15.7 | 23.2 | 26 |
| 100M < % < 1,000,000[8] | 52.2 | 36.4 | 39.9 | 40.6 | 33.3 |
| EB[9] ppm[10] | 190 | 200 | 530 | 560 | 900 |
| Styrene ppm | 450 | 750 | 800 | 100 | 110 |
| Dimers ppm | 500 | 5140 | 890 | 1820 | 1930 |
| Trimers ppm | 9300 | 1570 | 8960 | 2110 | 2010 |
| MFR[11] | 28 | 20 | 43.9 | 36.9 | 58.4 |
| Tg[12] | 105 | 103 | 105 | 102 | 102 |
| Elongational Viscosity[13] | 667,224 | — | 1,095,351 | 1,869,242 | 1,781,647 |

TABLE 1 NOTES
RESIN PROPERTIES
[1]$M_w$ - weight average molecular weight according to SEC
[2]$M_n$ - number weight average molecular weight according to SEC
[3]$M_z$ - Z weight average molecular weight according to SEC
[4]$M_w/M_n$ - polydispersity index
[5]% > 1MM - percent of polymer chains having a $M_w$ > 1,000,000
[6]% < 100M - percent of polymer chains having a $M_w$ < 100,000
[7]% < 25M - percent of polymer chains having a $M_w$ > 25,000
[8]100M < % < 1,000,000 - percent of polymer chains having a 100,000 < $M_w$ < 1,000,000
[9]EB - ethyl benzene
[10]ppm - parts per million by weight
[11]MFR - melt flow rate according to ASTM-1238, Condition 200/5
[12]Tg - glass transition temperature
[13]True Elongational Viscosity (160° C.) - The true elongational viscosity is determined using a tensile rheometer (Rheoscope CEAST 1000). The polymer strand is extruded through a die (L/D:8/2 mm) at a constant throughput rate (11.8 mm³/s). The strand is then pulled down by a drawing roll with controlled speed, and the melt tension is measured in gram force. Different drawn speeds resulted in different melt tension values. The test is performed at isothermal conditions. The true elongational viscosity (Pa · s) is calculated as the ratio of true elongational stress (N/m²) and the true elongational strain rate (1/sec).

TABLE 2

FOAMS OF EXAMPLE 1 AND CONTROL EXAMPLE 1

| Run No. | Resin Type | Carbon Dioxide Level (pph) | $T_f^1$ (°C.) | $P_D^2$ (psig (bar)) | Die Gap (inch (mm)) | $\Delta P^3$ (psig (bar)) | Density (pcf (kg/m³)) | Cell Size (mm) | Open Cell Content (percent) | Foam Thickness (cm) | Foam Width (cm) | Foam Cross Section Area[4] (cm²) |
|---|---|---|---|---|---|---|---|---|---|---|---|---|
| 1 | Broad Dist. Resin #2 | 3.6 | 124 | 1600 (110.3) | 0.081 (2.06) | 930 (64.1) | 3.07 (49.1) | 0.15 | 0.34 | 2.291 | 2.842 | 5.114 |
| 2 | Broad Dist. Resin #2 | 3.6 | 133 | 1630 (112.4) | 0.049 (1.24) | 640 (44.1) | 2.80 (44.8) | 0.38 | 1.56 | 1.885 | 2.657 | 3.934 |
| 3 | Broad Dist. | 3.6 | 138 | 1570 | 0.042 | 580 | 2.62 (41.9) | 0.30 | 0.72 | 1.552 | 2.731 | 3.329 |

TABLE 2-continued

FOAMS OF EXAMPLE 1 AND CONTROL EXAMPLE 1

| Run No. | Resin Type | Carbon Dioxide Level (pph) | $T_f^1$ (°C.) | $P_D^2$ (psig (bar)) | Die Gap (inch (mm)) | $\Delta P^3$ (psig (bar)) | Density (pcf (kg/m³)) | Cell Size (mm) | Open Cell Content (percent) | Foam Thickness (cm) | Foam Width (cm) | Foam Cross Section Area[4] (cm²) |
|---|---|---|---|---|---|---|---|---|---|---|---|---|
|   | Resin #2 |   |   | (108.3) | (1.07) | (40.0) |   |   |   |   |   |   |
| 4 | Broad Dist. Resin #2 | 4.5 | 125 | 1600 (110.3) | 0.052 (1.32) | 690 (47.6) | 2.88 (46.1) | 0.15 | 0.60 | 1.483 | 2.443 | 2.845 |
| 5 | Broad Dist. Resin #2 | 4.5 | 133 | 1590 (109.7) | 0.038 (0.97) | 590 (40.7) | 2.46 (39.4) | 0.15 | 0.73 | 1.166 | 2.576 | 2.359 |
| 6 | Control Resin #1 | 3.6 | 125 | 1600 (110.3) | 0.080 (2.08) | 1100 (75.9) | 3.35 (53.6) | 0.50 | 1.37 | 2.230 | 2.992 | 5.240 |
| 7 | Control Resin #1 | 3.6 | 133 | 1610 (111.0) | 0.043 (1.09) | 710 (48.9) | 2.72 (43.5) | 0.36 | 1.02 | 1.359 | 3.020 | 3.223 |
| 8 | Control Resin #1 | 3.6 | 138 | 1630 (112.4) | 0.031 (0.79) | 540 (37.2) | 2.65 (42.4) | 0.36 | 2.12 | 0.838 | 2.855 | 1.879 |
| 9 | Control Resin #1 | 4.5 | 125 | 1600 (110.3) | 0.047 (1.19) | 730 (50.4) | 2.89 (46.2) | 0.32 | 0.16 | 1.537 | 2.664 | 3.216 |
| 10 | Control Resin #1 | 4.5 | 129 | 1630 (112.4) | 0.032 (0.81) | 620 (42.8) | 2.57 (41.1) | 0.23 | 0.97 | 0.904 | 2.685 | 1.906 |
| 11 | Control Resin #1 | 4.5 | 132 | 1610 (111.0) | 0.030 (0.76) | 490 (33.8) | 2.36 (37.8) | 0.22 | 1.70 | 1.019 | 2.667 | 2.134 |

[1]$T_f$ - foaming temperature
[2]$P_D$ - die pressure (pounds per square inch gauge)
[3]$\Delta P$ - pressure drop from mixer inlet to die
[4]Foam thickness, width, and cross-section for foams made by "free" method defined in Table 4

TABLE 3

FOAMS OF EXAMPLE 2 AND CONTROL EXAMPLE 2

| Run No. | Control Resin #1 (lb/hr (kg/hr)) | Broad Dist. Resin #2 (lb/hr (kg/hr)) | SaMS Copolymer (lb/hr (kg/hr)) | Carbon Dioxide (pph) | Foaming Temperature (°C.) | Die Gap (mm) | $\Delta P$ (psi (bar)) | Density (pcf (kg/m³)) | Average Cell Size (mm) |
|---|---|---|---|---|---|---|---|---|---|
| 1 | 180 (81.7) | 0 | 20 (9.1) | 4.7 | 125 | 1.27 | 1105 (76) | 2.31 (37.0) | 0.23 |
| 2 | 180 (81.7) | 0 | 20 (9.1) | 4.7 | 127 | 1.14 | 1077 (74) | 2.19 (35.0) | 0.19 |
| 3 | 180 (81.7) | 0 | 20 (9.1) | 4.7 | 127 | 1.14 | 974 (67) | 2.23 (35.7) | 0.19 |
| 4 | 180 (81.7) | 0 | 20 (9.1) | 4.7 | 129 | 1.09 | 838 (58) | 2.14 (34.2) | 0.19 |
| 5 | 0 | 200 (90.8) | 0 | 4.7 | 127 | 1.70 | 876 (60) | 2.16 (34.6) | 0.17 |
| 6 | 0 | 200 (90.8) | 0 | 4.7 | 127 | 1.70 | 882 (61) | 2.12 (33.9) | 0.17 |
| 7 | 0 | 200 (90.8) | 0 | 4.7 | 129 | 1.52 | 861 (59) | 2.10 (33.6) | 0.16 |
| 8 | 0 | 200 (90.8) | 0 | 4.7 | 131 | 1.37 | 816 (56) | 2.10 (33.6) | 0.15 |
| 9 | 0 | 190 (86.3) | 10 (4.5) | 4.7 | 131 | 1.32 | 689 (48) | 2.07 (33.1) | 0.15 |
| 10 | 0 | 190 (86.3) | 10 (4.5) | 4.7 | 129 | 1.45 | 722 (50) | 2.11 (33.8) | 0.17 |
| 11 | 0 | 190 (86.3) | 10 (4.5) | 4.7 | 127 | 1.57 | 760 (52) | 2.14 (34.2) | 0.17 |
| 12 | 0 | 200 (90.8) | 0 | 4.9 | 127 | 1.60 | 734 (51) | 2.12 (33.9) | 0.15 |
| 13 | 0 | 200 (90.8) | 0 | 5.1 | 127 | 1.42 | 722 (50) | 2.09 (33.4) | 0.14 |

| Run No. | Open Cell (percent) | Foam Thickness (inches (mm)) | Cross-Section (inches (mm²)) | WD at 7 days | Volume Percent Change at 85° C. | Compressive Strength (kPa (psi)) Vert | Ext | Horz |
|---|---|---|---|---|---|---|---|---|
| 1 | 2.4 | 1.250 (32) | 8.28 (210) | 1.6 | 0 | 502 (72.9) | 190 (27.6) | 197 (28.6) |
| 2 | 5.1 | 1.375 (35) | 9.45 (240) | 1.9 | −0.2 | 468 (67.9) | 179 (25.9) | 189 (27.4) |
| 3 | 10.5 | 1.125 (29) | 7.52 (191) | — | −0.7 | 523 (75.9) | 228 (33.1) | 210 (30.5) |
| 4 | 27.2 | 1.125 (29) | 8.02 (204) | 1.5 | −0.8 | 430 (62.4) | 158 (22.9) | 148 (21.5) |
| 5 | 1.1 | 1.250 (32) | 9.27 (236) | 2.1 | −1.1 | 396 (57.5) | 167 (24.2) | 170 (24.7) |
| 6 | 2.2 | 1.500 (38) | 12.0 (305) | 1.7 | 0.6 | 407 (59.1) | 98 (14.2) | 125 (18.1) |
| 7 | 1.8 | 1.188 (30) | 9.06 (230) | 1.9 | 0.2 | 383 (55.6) | 149 (21.6) | 158 (22.9) |
| 8 | 3.0 | 1.063 (28) | 7.44 (180) | 1.8 | −1.1 | 356 (51.7) | 173 (25.1) | 135 (19.6) |
| 9 | 7.2 | 1.063 (27) | 9.27 (236) | 1.7 | 0.4 | 371 (53.9) | 210 (30.5) | 151 (21.9) |
| 10 | 8.9 | 1.250 (32) | 9.92 (252) | 1.9 | 1 | 370 (53.7) | 115 (16.7) | 148 (21.5) |
| 11 | 7.8 | 1.313 (33) | 9.27 (236) | 1.7 | −1.5 | 413 (59.9) | 140 (20.3) | 163 (23.7) |
| 12 | 6.5 | 1.313 (33) | 9.27 (236) | 1.6 | −1.1 | 427 (61.9) | 148 (21.5) | 169 (24.5) |
| 13 | 5.9 | 1.250 (32) | 9.27 (236) | 1.3 | −0.4 | 484 (70.2) | 105 (15.2) | 145 (21.0) |

Foam thickness, width, and cross-section determined by "constrained" method defined in Table 4
WD measured according to DIN 18164

TABLE 4

FOAM PROPERTIES AT DIFFERENT FOAMING TEMPERATURES
FOR POLYMERS USED IN EXAMPLES

| PROPERTY | Control Resin #1 | Broad Dist. Resin #2 | Broad Dist. Resin #3 | Broad Dist. Resin #4 |
|---|---|---|---|---|
| Pressure Drop (bar) | | | | |
| 130° C. | 32.0 | 27.0 | 33.0 | 27.3 |
| 125° C. | 38.0 | 33.7 | 39.3 | 34.7 |
| 120° C. | 46.0 | 39.0 | 46.0 | 46.0 |
| 115° C. | 56.0 | 48.3 | 56.7 | 58.7 |
| Density (kg/m$^3$) | | | | |
| 130° C. | 44.0 | 43.9 | 44.0 | 45.1 |
| 125° C. | 45.1 | 45.1 | 44.3 | 45.0 |
| 120° C. | 48.8 | 47.8 | 46.5 | 47.4 |
| 115° C. | 53.9 | 54.3 | 50.0 | 51.6 |
| Die Gap (mm) | | | | |
| 130° C. | 0.70 | 0.92 | 0.80 | 0.95 |
| 125° C. | 0.79 | 1.13 | 0.99 | 1.18 |
| 120° C. | 0.93 | 1.28 | 1.13 | 1.42 |
| 115° C. | 1.11 | 1.38 | 1.40 | 1.77 |
| Cell Size (mm) | | | | |
| 130° C. | — | — | — | — |
| 125° C. | 0.24 | 0.25 | 0.26 | 0.33 |
| 120° C. | 0.27 | 0.27 | 0.28 | 0.35 |
| 115° C. | — | — | — | — |

FOAM PROPERTIES AT DIFFERENT FOAMING TEMPERATURES

| | Control Resin #1 | | Broad Dist. Resin #2 | | Broad Dist. Resin #3 | | Broad Dist. Resin #4 | |
|---|---|---|---|---|---|---|---|---|
| PROPERTY | Free[1] | Const.[2] | Free[1] | Const.[2] | Free[1] | Const.[2] | Free[1] | Const.[2] |
| Thickness (mm) | | | | | | | | |
| 130° C. | 7.0 | 8.7 | 8.6 | 11.6 | 9.2 | 12.2 | 10.6 | 12.8 |
| 125° C. | 8.6 | 10.5 | 10.8 | 15.1 | 11.5 | 14.7 | 12.2 | 16.9 |
| 120° C. | 11.2 | 13.9 | 13.1 | 17.9 | 12.3 | 19.4 | 15.8 | 23.4 |
| 115° C. | 12.9 | 17.4 | 14.9 | 17.7 | 17.1 | 22.7 | 20.6 | 27.7 |
| Cross-Section (mm$^2$) | | | | | | | | |
| 130° C. | 200 | 294 | 357 | 408 | 297 | 402 | 317 | 428 |
| 125° C. | 244 | 303 | 332 | 495 | 357 | 490 | 378 | 578 |
| 120° C. | 317 | 405 | 380 | 563 | 369 | 602 | 521 | 836 |
| 115° C. | 338 | 486 | — | — | 484 | 688 | 635 | 967 |

[1]Free = no forming plates used after die
[2]Constrained = forming plates used after die to extent sufficient to form a uniform cross-section While embodiments of the foam and the process of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making an extruded, monovinyl aromatic polymer foam, comprising:
   a) heating to form a melt polymer material a polymer material comprising greater than 50 percent by weight of monovinyl aromatic monomeric units and comprising a monovinyl aromatic polymer having:
      i) a weight average molecular weight of about 100,000 to about 250,000; and
      ii) greater than 5 percent by weight of its polymer chains of a weight average molecular weight of 500,000 to 1,000,000 and less than 5 percent by weight of its polymer chain of a weight average molecular weight or greater than 1,000,000;
   b) incorporating into the melt polymer material at an elevated pressure a blowing agent to form a formable gel;
   c) cooling the formable gel to a desirable foaming temperature;
   d) extruding the formable gel through a die to form the foam.

2. The process of claim 1, wherein a nucleating agent is incorporated into the melt polymer material.

3. The process of claim 1, wherein the polymer has a Z-average molecular weight of from about 200,000 to about 900,000, about 10 percent or more by weight of its polymer chains have a weight average molecular weight of 500,000 to 1,000,000, and a melt flow rate of from about 6 to about 99.

4. The process of claim 2, wherein the polymer has a Z-average molecular weight of from about 200,000 to about 900,000, about 10 percent or more by weight of its polymer chains have a weight average molecular weight of 500,000 to 1,000,000, and a melt flow rate of from about 10 to about 99.

5. The process of claim 1, wherein the polymer has a Z-average molecular weight of from about 250,000 to about 600,000, about 10 percent or more by weight of its polymer chains have a weight average molecular weight of 500,000 to 1,000,000, and a melt flow rate of from about 15 to about 60.

6. The process of claim 2, wherein the polymer has a Z-average molecular weight of from about 250,000 to about 600,000, about 10 percent or more by weight of its polymer chains have a weight average molecular weight of 500,000 to 1,000,000, and a melt flow rate of from about 15 to about 60.

7. The process of claim 1, wherein the blowing agent is selected from the group consisting of carbon dioxide and 1,1,1,2-tetrafluoroethane.

8. The process of claim 2, wherein the blowing agent is selected from the group consisting of carbon dioxide and 1,1,1,2-tetrafluoroethane.

9. The process of claim 4, wherein the blowing agent is selected from the group consisting of carbon dioxide and 1,1,1,2-tetrafluoroethane.

10. The process of claim 6, wherein the blowing agent is selected from the group consisting of carbon dioxide and 1,1,1,2-tetrafluoroethane.

* * * * *